US005896763A

United States Patent [19]

Dinkelborg et al.

[11] Patent Number: 5,896,763

[45] Date of Patent: Apr. 27, 1999

[54] LOCKING DEVICE WITH A LEAF-RESTRAINING DEVICE

[75] Inventors: Alfred Dinkelborg; Ludger Kaup, both of Everswinkel, Germany

[73] Assignee: Winkhaus GmbH & Co. KG, Telgte, Germany

[21] Appl. No.: 08/974,364

[22] Filed: Nov. 19, 1997

Related U.S. Application Data

[63] Continuation of application No. PCT/EP96/02693, Jun. 20, 1996.

[30] Foreign Application Priority Data

Jun. 22, 1995 [DE] Germany ........................... 195 22 641

[51] Int. Cl.$^{6}$ ........................ C03B 13/00

[52] U.S. Cl. ........................ 70/93; 70/108; 292/269

[58] Field of Search ........................ 70/93, 107, 108, 70/134; 292/262, 265–269, 341.17

[56] References Cited

U.S. PATENT DOCUMENTS

| | | | |
|---|---|---|---|
| 1,723,063 | 8/1929 | Nelson . | |
| 1,723,064 | 8/1929 | Nelson | 70/93 |
| 2,329,017 | 9/1943 | Voight | 70/93 |
| 2,329,018 | 9/1943 | Voight | 70/93 |
| 2,505,320 | 4/1950 | Bernhard | 292/269 |
| 5,048,880 | 9/1991 | Narazaki | 292/268 X |
| 5,495,731 | 3/1996 | Rizik | 70/108 |

FOREIGN PATENT DOCUMENTS

| | | | |
|---|---|---|---|
| 72857 | 12/1916 | Austria | 70/93 |
| 386038 | 6/1988 | Austria . | |
| 0560017 | 9/1993 | European Pat. Off. . | |
| 546902 | 11/1922 | France | 70/93 |
| 1338947 | 8/1963 | France | 70/93 |
| 2616839 | 12/1988 | France . | |
| 50064 | 12/1888 | Germany | 70/93 |
| 265496 | 6/1912 | Germany | 70/93 |
| 3402045 | 7/1985 | Germany . | |
| 3503466 | 8/1986 | Germany . | |
| 3836694 | 5/1990 | Germany . | |
| 4015880 | 11/1991 | Germany . | |
| 16252 | 7/1912 | United Kingdom | 70/93 |

*Primary Examiner*—Suzanne Dino Barrett
*Attorney, Agent, or Firm*—Baker & Botts, L.L.P.

[57] ABSTRACT

A locking device for a door, or the like, with a fixed frame and a leaf includes a main lock and a leaf-restraining device on the leaf, with a driving pin of the leaf-restraining device being engageable with a gap limiter installed on the fixed frame. The main lock and the leaf-restraining device are connected to each other in such a manner that, from the main lock the driving pin can only be disengaged from the gap limiter by operating the latch of the main lock by means of a locking element.

33 Claims, 5 Drawing Sheets

LOCKING DEVICE WITH A LEAF-RESTRAINING DEVICE

CROSS-REFERENCE

This is a continuation application of international application number PCT/EP96/02693 filed on Jun. 20, 1996, designating the U.S.A.

FIELD OF THE INVENTION

The present invention concerns a locking device for a door, etc., having a fixed frame and a leaf, comprising a main lock on the leaf with a bolt which can be operated by means of a locking element, specifically a key, via a bolt-operating device and a latch which can be operated both by means of the locking element and by means of a door handle, etc., via a latch-operating device, the latch being engageable with an edge plate on the side of the fixed frame, and comprising a leaf-restraining device on the leaf, which is separate from the main lock, having a driving pin which is supported in a moveable manner in the housing of the leaf-restraining device by means of a driving-pin-operating device moveable between a release position and a driving position and which, when the leaf is closed, is disengaged from an engagement section of a gap limiter attached to the fixed frame in its release position and engaged with the engagement section in its driving position in order to move the gap limiter, on opening of the leaf, until a maximum possible gap position of the leaf, determined by the gap limiter, is reached, with the main lock and the leaf-restraining device being connected to each other in such a manner that the driving pin can be moved, from the main lock, from the driving position to the release position by means of the locking element.

BACKGROUND OF THE INVENTION

This type of locking device is known from DE 3,503,466 C2, which concerns a locking device for a door in which the main lock is designed as a connecting rod lock with a connecting rod which is connected to the bolt-operating device. The connecting rod is used, on the one hand, to mechanically connect the main lock with at least one auxiliary lock which is separate from the main lock, and each of which has one auxiliary bolt. Because the main lock is connected with at least one auxiliary lock by means of the connecting rod, on operation of the bolt of the main lock, the auxiliary bolt(s) is/are also operated from the main lock by means of a key. Therefore, when the bolt of the main lock is slid out, the auxiliary bolt of at least one auxiliary lock is also slid out (with corresponding displacement of the connecting rod in one direction), and when the bolt of the main lock is retracted, the auxiliary bolt of at least one auxiliary lock is correspondingly retracted (with displacement of the connecting rod in the opposite direction).

The leaf-restraining device of the known locking device, also referred to in the following as a door-restraining device, has a handle with which the driving pin can only be moved back and forth between the release position and the driving position from the inside of the door, and with which, in the present case, it can be retracted and/or slid out.

With the driving pin positioned in the driving position, it would be possible to open the door from outside only up to the maximum possible gap position of the leaf, unless a means were provided for moving the driving pin into the release position from the outside of the door. So that the driving pin can be moved from the locked position into the driving position from the outside of the door, and so that the door can therefore be completely opened from the outside as well, in the known locking device, the door-restraining device is connected to the main lock via the connecting rod, which is also provided in order to connect at least one auxiliary lock to the main lock. For this purpose, the connecting rod has a cam which is attached to the connecting rod in the area of the door-restraining device, which is positioned on one side of the driving pin in a first position when the bolt is retracted and on the other side of the driving pin in a second position when the bolt is slid out. When the bolt is slid out or retracted, the cam is therefore moved between the first and second position. When the driving pin is positioned in the driving position, the cam cooperates with an adjoint piece on the driving pin and moves the driving pin into the release position during its movement between the first and second position, i.e., retracts it into the door-restraining device.

The above explanations clearly show that in order to move the driving pin from the driving position to the release position, it is necessary to close the main lock in order to slide the bolt in or out. If the driving pin is in the driving position, but the bolt has not been slid out, the bolt must first be slid out in order to operate the driving pin by means of the locking element and/or key from the main lock, i.e., the locking device must be closed so that the cam on the connecting rod passes the driving pin and thus moves the driving pin into the release position. Now, however, the locking device is closed, and it must again be opened, i.e., the bolt must also be retracted again.

In this configuration, therefore, a complete locking cycle is required in order, from the main lock, to move the driving pin from the driving position to the release position by means of the locking element. This considerably impairs the normal procedure of opening a door by means of a lock, etc., from outside, because one ordinarily simply inserts the key into the lock and turns it in the opening direction until the latch is retracted, and before this, if applicable, the bolt must be pulled in before the door can be opened. In the above-described configuration, one must first turn the key in the locking direction in order to move the driving pin into the release position, and only then can one turn it in the ordinary opening direction in order to open the door. From an ergonomic standpoint, the above-described procedure is extremely unfavorable in opening the door from the outside. The configuration described below also clearly shows that the known locking device is ergonomically unfavorable, such that a situation can easily arise in which improper operation of the locking device adversely affects security.

Let us assume that a person wishes to open an apartment door equipped with the known locking device, wishing to open the door only slightly, keeping it secured with the door-restraining device, for example, because someone unknown to the person has rung the doorbell. In this case, the person will move the driving pin to the driving position by means of corresponding operation of the door-restraining device. Provided that the door is not bolted, the door can now be opened by operating the door handle, etc., in order to operate the latch, and the door is secured by means of the door-restraining device against opening farther than the maximum possible gap position. However, if the door is bolted, i.e., if the bolt of the main lock has been slid out, one must first unbolt the door in order to open it, i.e., retract the bolt. In doing so, however, the driving pin is again placed in the release position. The door can now be freely opened if the latch is operated. In order to restore the security function of the door-restraining device, the person must therefore reset the door-restraining device so that the driving pin is again placed in the driving position. However, a person may easily forget to reset the door-restraining device. On many occasions, the very persons who have a particular requirement for the protection afforded by the door-restraining device, such as children or elderly people, may find it too difficult to operate the known locking device in the proper manner in order to provide sufficient security.

Another possibility of faulty operation in the case of the known locking device should be mentioned. It is possible that a person who wishes to open the door only slightly may attempt to keep the driving pin in the driving position by correspondingly holding a handle, knob, etc., of the door-restraining device in place, while this person, if necessary, unbolts the door, i.e., retracts the bolt of the main lock. However, if the driving pin is held in the driving position, the connecting rod is also blocked from being moved in the unbolting direction, because the cam must pass by the driving pin. This makes it either impossible or very difficult to unbolt the door against the force exerted on the handle of the door-restraining device.

The above examples clearly show that the known locking device is extremely disadvantageous from an ergonomic standpoint and that it allows the possibility of erroneous operation which may seriously impair security.

The object of the invention is to provide a locking device of the aforementioned type which can be operated in an ergonomically favorable manner and which largely eliminates any possibility of erroneous operation which would impair security. In order to achieve this object, in the invention, the driving pin can only be moved from the driving position to the release position from the main lock by operating the latch by means of the locking element.

SUMMARY OF THE INVENTION

In the locking device according to the invention, the steps carried out in opening the door from the outside by means of a locking element remain unchanged with respect to the steps carried out in a door with a locking device not having a leaf-restraining device or door-restraining device. Therefore, a key used as a locking element need be turned in the direction of opening only far enough so that, after previous retraction of the bolt which has been slid out, if applicable, the latch is operated so that the door can be opened. The procedure is completely independent of whether the driving pin is in the driving position or the release position. If the driving pin is in the driving position, but the door is not bolted, i.e., the bolt has not been slid out, the driving pin is moved to the release position on operation of the latch by means of the closing element, with a closing element in the form of a key, as explained above, being turned in the usual opening direction. It is by no means necessary to go through a complete locking cycle in order to move the driving pin to the release position in the locking device according to the invention.

The possibilities for erroneous operation on opening a door from the inside described above are also largely eliminated. Under the circumstances described above, a person who wishes to open the door only slightly while limiting the maximum possible gap position using the door-restraining or leaf-restraining device and who, after moving the driving pin to the driving position by correspondingly operating the door-restraining device, finds that the door is still bolted, would unbolt the door by means of the locking element without this causing the driving pin to be moved back to the release position. Now, if the person opens the door by operating the latch by means of the door handle, etc., the driving pin remains in the driving position, despite the door having previously been unbolted, and the door-restraining device can fulfill its security function, i.e., limit the angle of opening of the leaf in order to prevent a person from gaining entrance to the apartment from outside without the consent of the person in the apartment.

In the locking device according to the invention, the second of the aforementioned possibilities for erroneous operation, i.e., locking of the main lock by the leaf-restraining device, can easily be eliminated by means of corresponding design of the main lock, the leaf-restraining device, and/or the method of connection of the main lock to the leaf-restraining device, as will be explained in detail in the following.

The main lock can be connected to the door-restraining device by means of a connecting element which connects the latch-operating device and the driving-pin-operating device. On the side of the main lock, the connecting element can be connected with a component device of the latch-operating device which is operated by the locking element, possibly via the bolt-operating device. In the case of electrical operating devices in particular, electrical connection by means of a signal line, etc., would be a possibility.

Mechanical connection of the main lock and the door-restraining device is preferred over electrical connection thereof. In this case, the connecting element may be a pulling element such as a pulling wire or a pressure element, preferably a connecting rod. This design of the locking device provides high functional reliability.

In order to move the driving pin from the driving position to the release position from the main lock, the connecting element may be operated by a latch lever which serves to retract the latch, also referred to as a changer. Preferably, in this case, the connecting element is subjected to a pulling force in order to move the driving pin from the driving position to the release position. It is particularly appropriate if the pulling force is transferred from the latch lever to the connecting element on swiveling of the latch lever in order to retract the latch. Transfer of the pulling force from the latch lever to the connecting element should preferably be carried out by means of a transfer lever which is supported such that it can be rotated, with it preferably being possible to engage one lever arm thereof with one end section of the latch lever which is closest to the latch. Compared to a locking mechanism without a door-restraining device, the main lock for connection according to the invention with a leaf-restraining device need therefore only be slightly modified, and it is sufficient to install an additional component, supported in a rotatable manner inside the main lock, in order to transfer the force between the latch lever, which may be elongated, and the connecting element. This results in only a minor increase in the difficulty of manufacturing, and therefore in the manufacturing cost.

The locking device may be designed in such a manner that the driving pin can be moved from the release position to the driving position from the main lock, e.g., by corresponding operation of the driving-pin-operating device via the connecting element. Independently of this, the driving-pin-operating device may have a manual adjusting component in order to manually move the driving pin between the driving position and the release position, possibly by means of a turning knob, etc. In this manner, the leaf-restraining device can be operated in a particularly simple way, specifically from the inside of the door.

In order to achieve the connection according to the invention between the leaf-restraining device and the main lock via the connecting element, the driving-pin-operating device should preferably have an additional component device which can be released via the connecting element or the manual adjusting component in order to move the driving pin, which is in the driving position, into the release position by means of the additional component device. Particular advantages are achieved if the additional component device has an energy-storing device which is loaded on moving the driving pin from the release position to the driving position and which prestresses the driving pin toward the release position. The energy-storing device may include spring devices, preferably at least one tension spring. By means of this energy-storing device, one requires only an extremely small amount of force in the main lock to move the driving pin, which is in the driving position, into the release position (specifically, only an extremely small amount of force must be transferred from the latch lever to the connecting element) in order to release the additional component device. Therefore, the force required to operate the latch via the locking element is only increased to a minor extent. As a further advantage, gear devices in order to coordinate the movement of the driving pin and the latch in such a manner that the driving pin reaches the release position when the latch is retracted can be dispensed with.

According to the configuration described above, the driving pin, after being moved into the driving position, must be held in the driving position until the additional component device is released. For this purpose, the additional component device may be equipped with corresponding holding means in order to hold the driving pin in the driving position.

There are many possible internal designs for the leaf-restraining device. According to a preferred embodiment, the driving pin is attached to a displaceably supported slide element with which the energy-storing device engages. Moreover, the holding means for holding the driving pin in the driving position may have a holding recess on the slide element and a moveable holding element, with the holding element having a holding engagement section, and with it being possible to move the holding element into a holding engagement position with the driving pin positioned in the driving position, and in said holding engagement position, the holding engagement section is engaged with the holding recess. In order to release the additional component device, it is then sufficient for the holding element to be moved in such a manner that the holding engagement section disengages from the holding recess.

A variety of embodiments is also possible with respect to the design of the holding element. For example, the holding element may be configured as a sliding element, with it preferably being possible to displace the holding element in a displacement direction which is essentially perpendicular to the displacement direction of the slide element. One may also use spring means, specifically at least one pressure spring, which prestresses the holding element in the direction of the holding engagement position.

No complex procedure is required to connect the leaf-restraining device and the main lock via the connecting device. For example, the connecting device may directly engage with the holding device in order to release the additional component device.

As mentioned above, the manual adjusting component should preferably be operated by means of a turning knob, etc. In this case, the manual adjusting component may have a knob nut, etc., which is associated with the turning knob, etc., with said knob nut directly engaging with the holding element with a first driving section in order to release the additional component device. Preferably, the knob nut, etc., should have a second driving section, preferably a driving arm, which engages with the slide element, and if applicable, engages with a driving recess of the slide element in order to move the driving pin from the release position into the driving position. In this case, it can be possible to turn the knob nut, etc., from a first turning position corresponding to the release position to a second turning position corresponding to the driving position in order to move the driving pin from the release position to the driving position, with the knob nut, when the driving pin is positioned in the driving position, engaging with the holding element and being held by the holding element in the second turning position until the second component device is released. After releasing of the additional component device, the knob nut is then turned back to the first turning position by means of the slide element, which is shifted by the force of the energy-storing device in order to move the driving pin back to the release position. In the latter configuration, with twist-proof coupling of the knob, etc., to the knob nut, etc., one can directly recognize by the position of the knob whether the driving pin is in the driving position or the release position.

In principle, there are many possibilities with respect to the construction and design of the gap limiter. For example, the gap limiter can be designed in the form of an elongated rod element which is supported such that it can be displaced in a direction perpendicular to the plane of the frame and which comes to rest with one end away from the leaf against a mounting piece attached to the frame. The gap limiter could also be designed in an embodiment using a chain. The gap limiter should preferably be designed in the form of a swiveling clip, with one end of the swiveling clip being attached in a swiveling manner to the fixed frame or to a mounting piece on the side of the fixed frame and having a slide as an engagement section which essentially extends in the longitudinal direction of the swiveling clip. It should preferably be possible to swivel the swiveling clip around an axis of rotation which is essentially parallel to the plane of the fixed frame.

A high degree of functional reliability of the leaf-restraining device designed with a swiveling clip as a gap limiter is achieved if the slide has a first slide section having a first slide width and a second slide section having a second slide width which is greater than the first slide width, with the second slide section being closer to the one end of the swiveling clip than the first slide section; if the driving pin has a pin head having a cross-sectional diameter which is less than the second slide width and greater than the first slide width; if the driving pin has a driving section adjacent to the pin head having a cross-sectional dimension smaller than the first slide width; if the pin head, with the leaf closed, on moving of the driving pin from the release position to the driving position, extends through the second slide section; and if the driving pin engages the slide with the driving section after extending through the second slide section and after the driving position has been reached, and in this configuration, when the leaf is slightly opened with the swiveling of the swiveling clip, the driving section enters from the second slide section into the first slide, and after reaching the maximum possible gap position of the leaf, comes into contact with one slide end away from the one end of the swiveling clip.

Specifically, according to another aspect of the invention, in order to additionally secure a closed door from the inside without requiring that the door be locked, it is proposed to design the leaf-restraining device in such a manner that it is possible to lock the door through it. In this connection, it should preferably be possible to move the driving pin with the leaf closed from the release position beyond the driving position into a locked position, in which it locks the leaf on the frame in the leaf locked position, preferably by engagement in the mounting piece on the side of the fixed frame, which is in the form of an edge plate, through the second slide section.

In a suitable embodiment, it should be possible to move the driving pin from the locked position into the release position from the main lock in operating the latch by means of the locking element. The holding means can hold the driving pin in the locked position after movement of the driving pin into the locked position, preferably by means of the manual adjusting component, until the additional component device is released, with the holding means preferably including an auxiliary holding recess on the slide element, which, with the driving pin positioned in the locked position, is engaged with the holding engagement section of the holding element in the holding engagement position of said holding element.

The locking device may have at least one auxiliary lock with an auxiliary bolt which is separate from the main lock and connected to it and which, by means of an auxiliary lock operating mechanism of the auxiliary lock, can be operated from the main lock. Preferably, it should be possible to operate the auxiliary bolt on operation of the bolt by means of the locking element.

The main lock and the auxiliary lock may be connected by means of a connecting element which connects the bolt-operating device and the auxiliary bolt-operating device. In the case of mechanical connection of the main lock and the auxiliary lock, a separate auxiliary connecting element is provided for this purpose, preferably in the form of a connecting rod, in addition to the connecting element for coupling the main lock and the door-restraining device. The connecting element and the auxiliary connecting element should preferably be arranged on top of each other or next to each other in a leaf groove, etc., in such a manner that they are moveable with respect to each other, with it being preferred to have the auxiliary connecting element positioned above the connecting element, and if applicable, to have the auxiliary connecting element covered toward the outside by a covering rail, etc.

According to another aspect, the invention concerns a door, etc., with a locking device as described above.

BRIEF DESCRIPTION OF THE DRAWING

In the following, the invention is described in greater detail by means of the practical examples shown in the figures.

DETAILED DESCRIPTION OF THE PREFERRED EMBODIMENT

Figure 3:
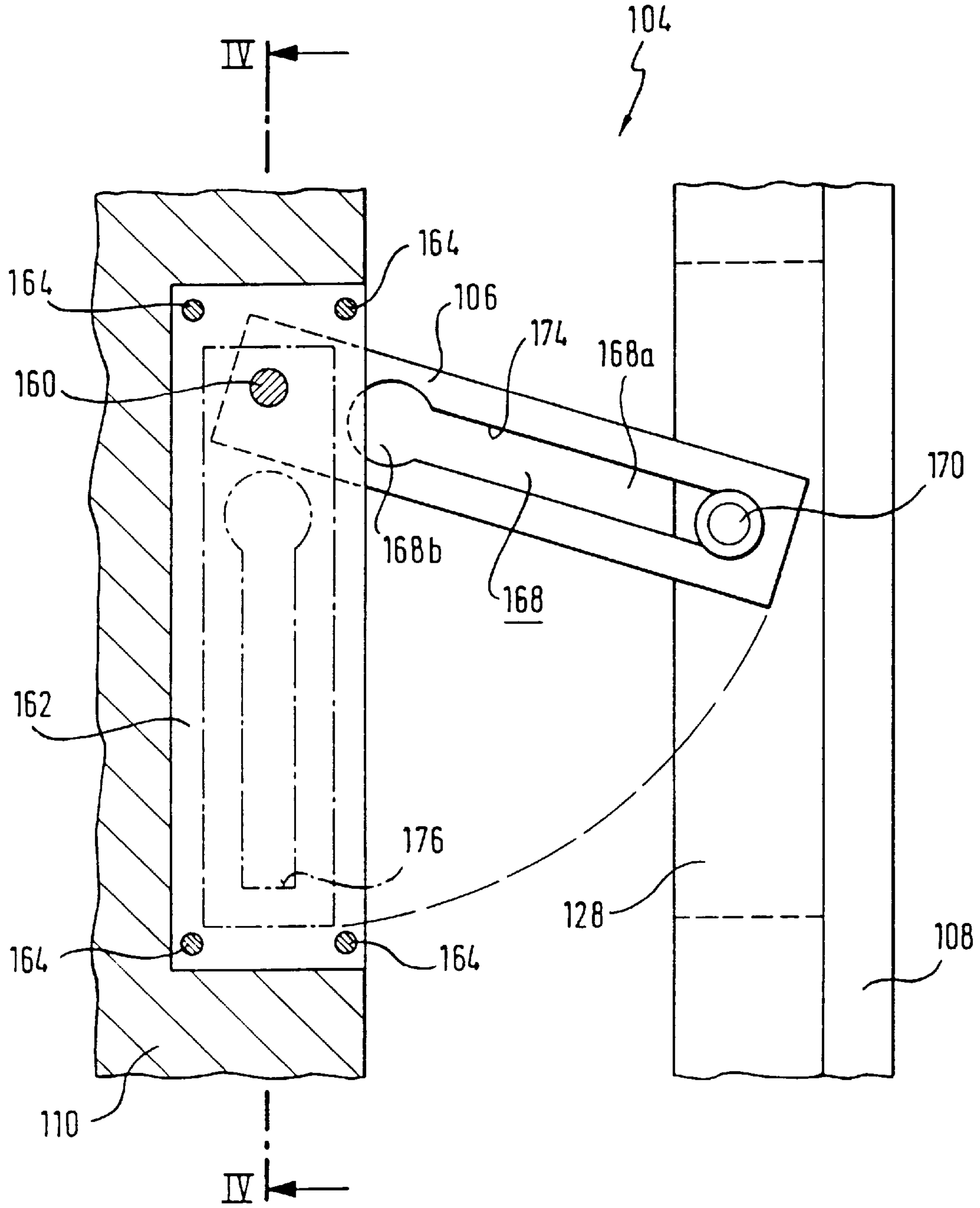
FIG. 3 shows a gap limiter, which cooperates with the driving pin of the leaf-restraining device according to the invention, in the form of a swiveling clip, with the leaf opened slightly in a partial sectional view (section along line III—III in FIG. 4)
Figure 4:
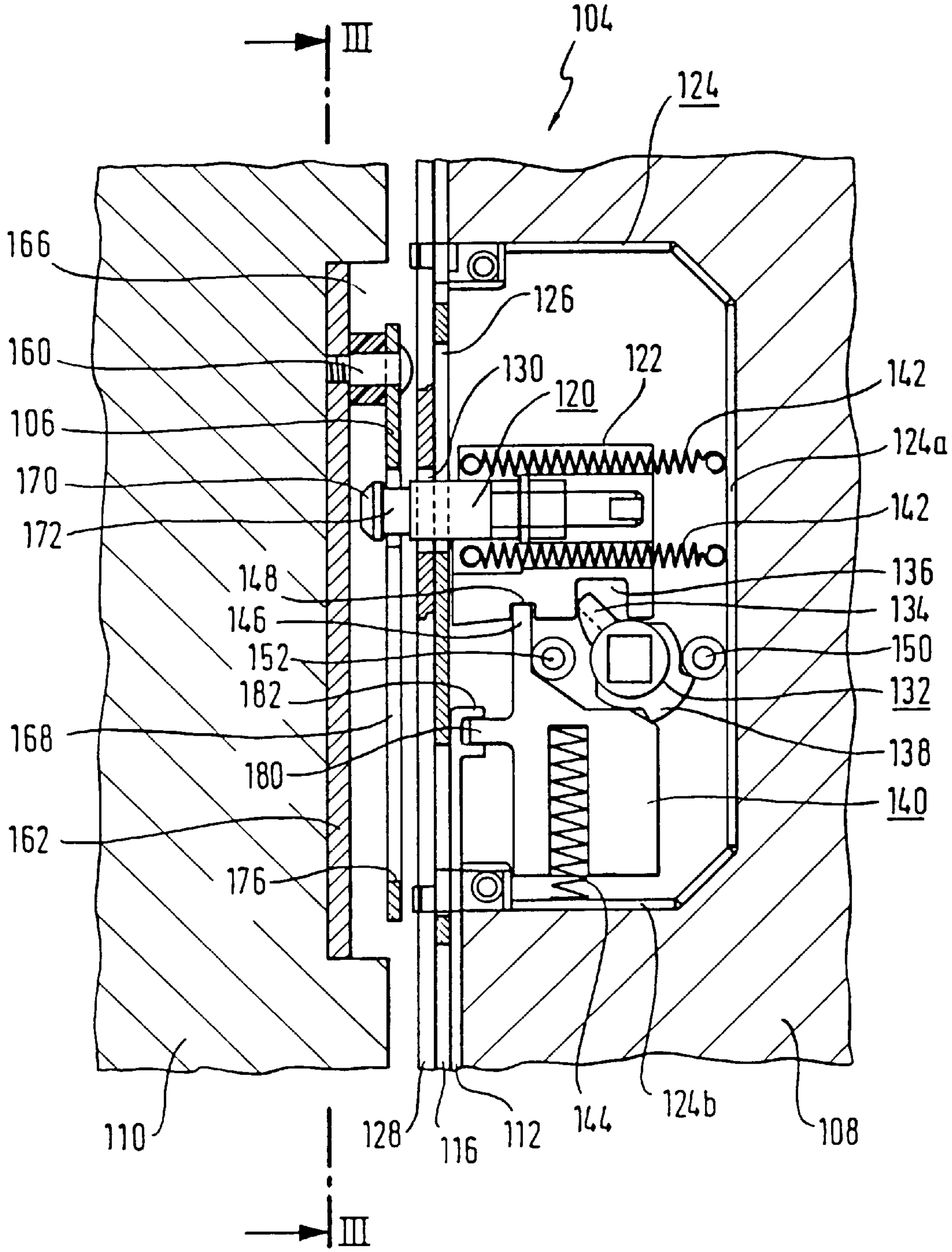
FIG. 4 shows the leaf-restraining device of FIG. 1 with the driving pin in the driving position and engaging with the swiveling clip with the leaf closed, with the swiveling clip, the leaf, and the fixed frame shown in sectional view in a plane which is parallel to the plane of the frame (section along line IV—IV in FIG. 3)

The locking device 100 shown in FIGS. 1, 3, and 4 has a connecting rod lock 102 as a main lock and a leaf-restraining device 104 on one leaf 108, as well as an edge plate (not shown), which is associated with the connecting rod lock or main lock 102, and a gap limiter 106 on the fixed frame 110. In the example shown, the leaf 108 is a door leaf, and it is therefore also appropriate to refer to the leaf-restraining device 104 as a door-restraining device 104. The door-restraining device 104 is connected to the main lock via a connecting rod 112. Moreover, an auxiliary connecting rod 116 is provided for connecting the main lock to additional components of the locking device, specifically with at least one auxiliary lock (not shown).

Before describing the door-restraining device 104 and its interaction with the main lock 102 or the gap limiter 106 in greater detail, we will first briefly describe the functioning of the main lock or connecting rod lock 102. The main lock is not completely shown in FIG. 1 for reasons of clarity, and for this reason, the reader is referred to FIG. 2, which shows a connecting rod lock which essentially has the same construction and differs from the main lock of FIG. 1 in the present connection only in minor details. The connecting rod lock of FIG. 2 has a profile cylinder 1 whose locking bit hub (not shown) is surrounded by a toothed rim 10 which has a slot 2 for connection with the locking bit, with the locking bit not reaching the root diameter of the toothed rim 10 in the area of two driving toothed wheels 12 and 12'. The toothed rim 10 is guided into a bearing 14, which is attached to the housing, with a flange outer periphery, and meshes with the two driving toothed wheels 12 and 12'.

The connecting rod lock has a connecting rod 16 and a bolt 18 whose bolting and unbolting operation is carried out by means of two turns each of the locking cylinder 1. At the end of the reducing gear A, which is formed by the toothed wheels 10, 12; 12', 13, and 15, a connecting rod drive pinion 20 is supported with a control element 22 which is firmly attached to the front side on the side of the lock cover. The control element 22 is designed with virtually circular radial cams 24 and 24' at both ends, and when the locking operation is carried out by the locking cylinder, the cams successively engage with corresponding recesses 26 and 26' of the connecting rod 16 and displace it.

On the axis 34 of the toothed wheel 12 positioned adjacent to the connecting rod 16, a transfer lever 35 is positioned in a swiveling manner coaxially thereto, and said lever partially overlaps a bolt tail 36. It has an arm 38 in the shape of a fork which surrounds a peg 40. A second arm 50 of the transfer lever 35 extends into a connecting rod recess 42 of the connecting rod 16, which is limited by cams 46 and 46' having rectangular control surfaces 44 and 44'.

When the connecting rod 16 and the bolt 18 are slid out, the lower control surface 44 of the upper cam 46 comes into contact with the second arm 50 of the transfer lever 35 and swivels it in a counterclockwise direction. By means of the peg-slot connection 38, 40, the bolt is extended (slid out). After the profile cylinder 1 is turned twice in a locking direction, the bolt 18 is completely slid out, and the arm 50 is then supported on the front surface 52 of the upper cam 46. At the same time, a peg 54 attached to the connecting rod is slid behind a shoulder 56 of the bolt 18.

As mentioned above in reference to the locking device of FIGS. 1, 3, and 4, the connecting rod 16 serves the purpose of connecting the main lock, for example, with at least one auxiliary lock of the locking device not shown in the figure, with the auxiliary lock having an auxiliary bolt which can be synchronously operated with the bolt 18 by means of the connecting rod 16, resulting in engagement in an edge plate on the side of the fixed frame.

Further components, which are specifically used for operation of the connecting rod 16 or the bolt 18, include a stop cam 28 and curved limiting fingers 30, 30' which are directed into the interior of the lock. The axis of rotation of the connecting rod drive pinion 20 is designated 32 in FIG. 2. The lock sleeve, specifically in the form of a covering rail, is designated 3.

The main lock has a latch 78 which can be operated by a handle nut 80 of a door handle and by the locking cylinder 1. A latch tail 58 of the latch 78 is fastened to a housing which can be displaced between the bottom of the lock 60 and the lock cover 62, with the housing 64 having two opposite longitudinal slots 66 and 66' for guiding purposes on its broad side, in which small guide pegs 68, 68' engage at the floor of the bottom of the lock 60 and lock cover 62, respectively. The rear wall of the housing 64 is designated 70 and is connected to the latch tail 58.

In order to retract the latch 78 by means of the door handle, the handle nut 80 is swiveled by approximately 45 degrees in a clockwise direction, at which time a carrier 82 which is formed in one piece on the handle nut 80 grips behind one shoulder 84 of the housing 64. The handle nut 80 is prestressed in the direction of the extended latch 78 by a pressure spring 88 which is placed in a spring housing 86, with the displaceable spring housing 86 engaging in a recess 92 of the handle nut 80 with a push rod 90. The handle nut 80 is supported in the normal position by a peg 94 which connects the bottom of the lock 60 and the lock cover 62.

For operation of the latch by means of the locking cylinder 1, a latch lever 96 is positioned at the bottom of the lock 60 coaxially to the connecting rod drive pinion 20 in such a manner that it can be swiveled, with said lever having its free end 98 in contact with the housing 64. The gear connection to the latch lever 96 comprises a carrier 21 positioned on the front surface on the lock bottom side of the connecting rod pinion 20, with said carrier, when the bolt 18 is closed and the locking cylinder is further turned in a clockwise direction, coming into contact with a nose 97 of the latch lever 96 and swiveling the latch lever 96 (also frequently referred to as a changer) in a clock-wise direction in order to retract the latch 78.

Figure 1A:
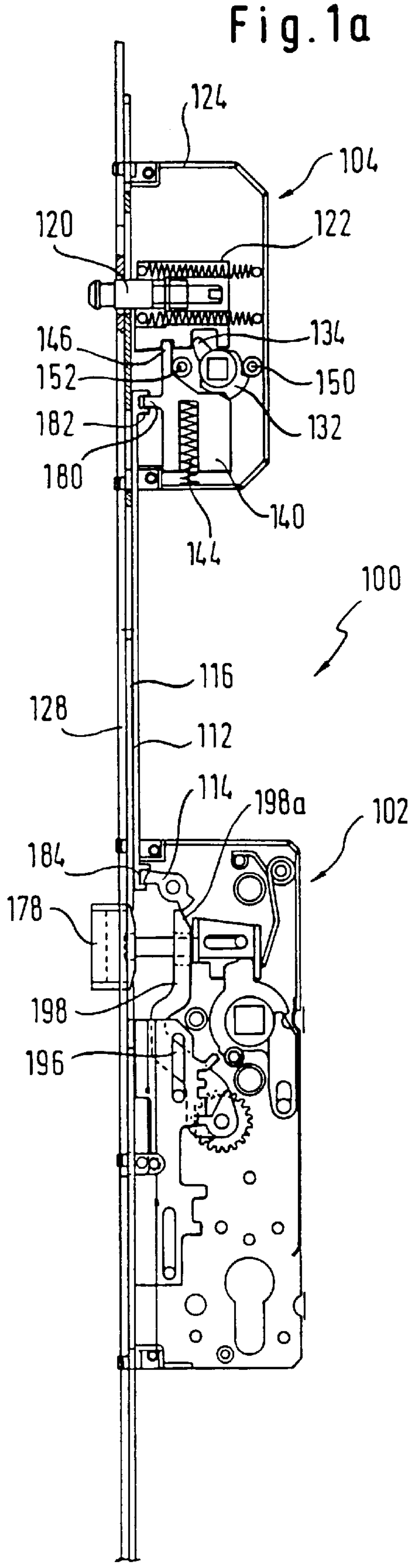
FIG. 1 shows the parts on the leaf side of a locking device according to the invention with a leaf-restraining device connected to a main lock, whose driving pin is in the driving position in FIG. 1*a* and the release position in FIG. 1*b;*
Figure 1B:
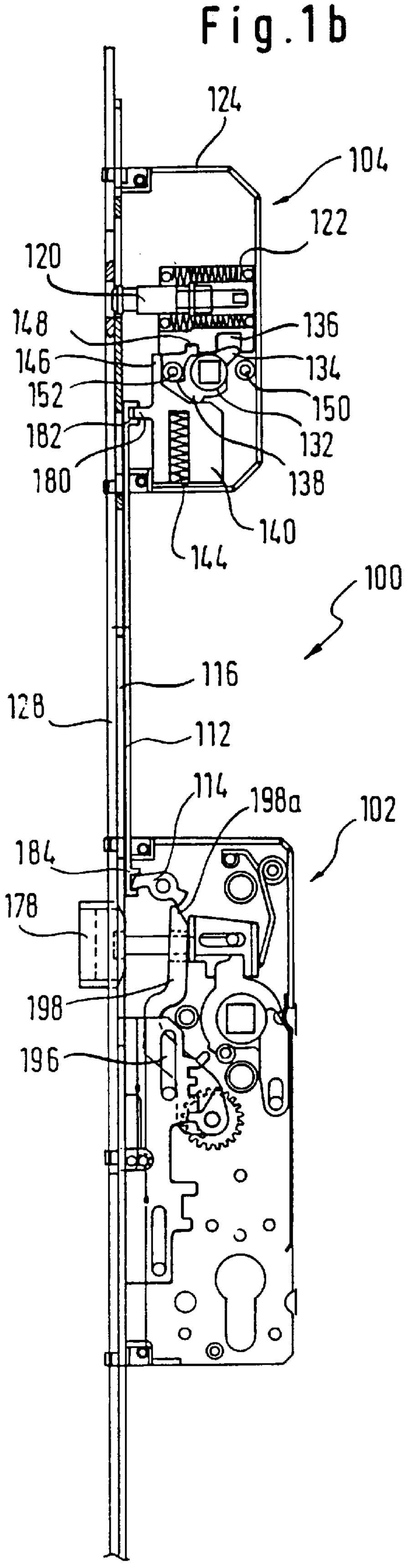
Figure 2:
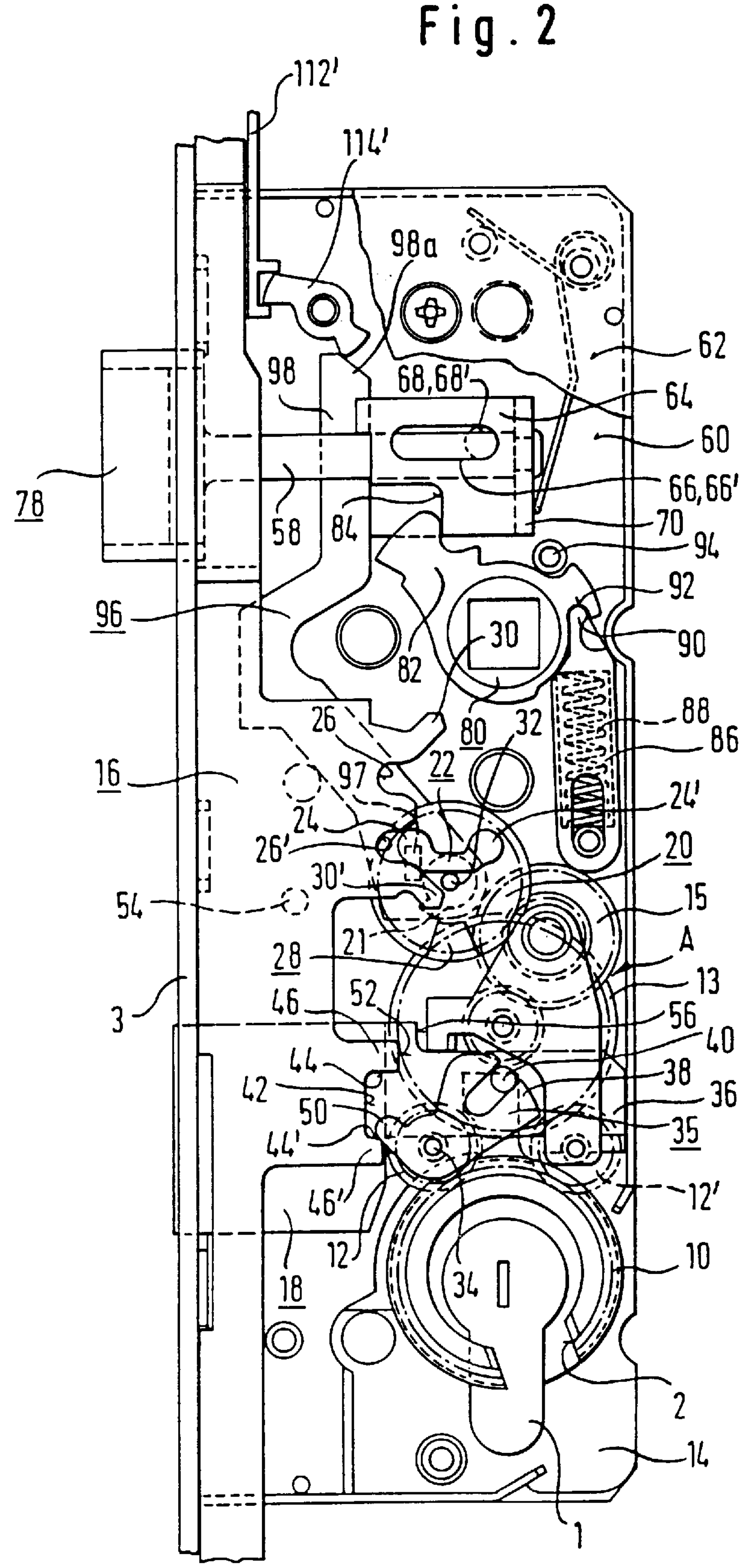
FIG. 2 shows a main lock essentially corresponding to the main lock of FIG. 1 in detail.

With respect to further details of the structure and functioning of the connecting rod lock of FIG. 2, the reader is referred to DE 3,901,223 C2, with FIG. 2 of the present document being based on FIG. 1 of the former document. A possible embodiment of the auxiliary lock and auxiliary bolt can also be found in the German Patent.

With respect to the connecting rod lock known from DE 3,901,223 C2, the connecting rod lock of the present FIG. 2 is modified in such a manner that the latch lever 96 is extended with its free end past the housing 64 in order to form an operation end section **98*a* for the purpose of operating an auxiliary connecting rod 112' via a transfer lever 114' (the auxiliary connecting rod 112' and the transfer lever 114' are therefore additionally provided with respect to the connecting rod lock known from DE 3,901,223 C2). The auxiliary connecting rod 112' is used for connection of the main lock to a corresponding leaf-restraining device or door-restraining device (as described in further detail below by means of the practical example of FIGS. 1, 3, and 4); said auxiliary connecting rod 112' will be referred to in the following as the driving pin connecting rod 112' (or 112 with respect to the practical example of FIGS. 1, 3, and 4) in order to make it more easily distinguishable, while the connecting rod 16 used for connecting the auxiliary lock and the main lock will be referred to in the following as the auxiliary bolt connecting rod 16 (or 116 with respect to the practical example of FIGS. 1, 3, and 4**).

Referring to FIGS. 1, 3, and 4, the leaf-restraining device 104 has a driving pin 120, which is supported in a displaceable manner on a slide element 122 in a housing 124 of the door-restraining device 104, with the driving pin 120, in a first displacement position of the sliding element, projecting out of the housing 124 on the sleeve side and protruding from the leaf on the sleeve side (this is referred to as the driving position of the driving pin) and being retracted into the housing 124 in a second slide position of the slide element 122 (this is referred to as the release position of the driving pin 120).

On the sleeve side, the auxiliary pin connecting rod 116 is guided past the housing 124 and shows an oblong hole 126, so that the driving pin 120 can be slid out of the housing 124 in any position of the auxiliary pin connecting rod 116, i.e., can be positioned in the driving position. Toward the outside, the auxiliary pin connecting rod 116 is covered by a covering rail 128 which is also guided past the housing 124 on the sleeve side, said covering rail having a hole 130 which allows the driving pin 120 to pass through.

The slide element 122 can be moved, by means of a turning knob which is not shown, from the displacement position shown in FIG. **1*b*, corresponding to the release position of the driving pin 120, to the displacement position shown in FIG. 1*a* and FIG. 4, corresponding to the driving position of the driving pin 120. For this purpose, the turning knob is connected to a knob nut 132 in a twist-proof manner, said knob nut being supported in the housing 124 in such a manner that it can be turned. The knob nut has a carrier arm 134 which engages with a carrier recess 136 of the slide element 122. Moreover, the knob nut 132 has a carrier section 138 which cooperates with a holding element 140 which is displaceably supported in the housing 124 with a displacement direction which is perpendicular to the displacement direction of the slide element 122**.

Moreover, the door-restraining device 104 has two pulling springs 142 and a pressure spring 144. The pulling springs act between the housing 124 and the slide element 122 and apply a pulling force to the slide element 122 parallel to the displacement direction of the slide element 122 in the direction of the housing wall **124*a* which is opposite the covering rail 128, i.e., in the direction from the displacement position of the slide element 122 corresponding to the driving position of the driving pin to the displacement position of the slide element 122 corresponding to the release position of the driving pin 120**.

The pressure spring 144 acts between the housing 124 and the holding element 140 and loads the holding element 140 with a pressure force parallel to the displacement direction of the holding element 140 from a lower housing wall **124*b* in the direction of the slide element 122. The holding element 140 has a holding finger 146 as a holding engagement section, and with the driving pin in the driving position, the upper end section of said holding finger is pressed by the pressure spring 144 so as to engage with a holding recess 148 on the slide element 122 in order to hold the slide element 122 in a displacement position corresponding to the driving position of the driving pin 120 against the pulling force on the slide element 122 exerted by the pulling springs 142**.

The functioning of the door-restraining device with respect to manual operation of the driving pin by means of the turning knob is as follows. Beginning from the position shown in FIG. 1*b*, on turning of the knob nut 132 in a counterclockwise direction by means of the turning knob, the carrier arm 134, which is engaged with the carrier recess 136, presses or displaces the slide element 122 in a forward direction against the pulling force of the pulling springs 142, i.e., in the direction of the covering rail 128, with the carrier section 138 pushing the holding element 140 downward against the pressing force of the pressure spring 144 in such a manner that the end section of the holding finger 146 is moved away from the slide element 122 in order to allow free movement of the slide element 122. After the knob nut has been turned 90 degrees, the shifting position of the slide element 122 corresponding to the driving position of the driving pin 120 is reached, and the driving section of the knob nut 132 releases the holding element 140 to such an extent that the end section of the holding finger 146 enters the holding recess 148 due to the pressing force of the spring 144 and holds the slide element 122 in this position, thus holding the driving pin 120 in the driving position. Because of contact of the carrier section 138 on one side with a stop 150 and engagement on the other side with the holding elements 140, the turning knob 132, in the turning position it has reached, is secured against further turning in a counterclockwise direction and against inadvertent turning back in a clockwise direction, with the sliding element 122 being held firmly in place.

Should the driving pin 120 again be moved back to the release position by operating the turning knob, the turning knob and therefore the knob nut 132 are to be turned back in a clock-wise direction, and in this case, because of the fact that the carrier section 138 and the holding element 140 are engaged, an initial resistance must be overcome in turning the turning knob. By turning the knob nut 132, the holding element 140 is pressed downward against the pressing force of the pressure spring 144, at which time the end section of the holding finger 146 dis-engages from the holding recess 148 of the slide element 122. As soon as the holding finger 146 and the holding recess 148 are disengaged, the turning knob no longer needs to be turned in a clockwise direction, as the pulling springs 142 now pull the slide element back to the original position, and thus pull the driving pin 120 into the release position. In this process, the knob nut 132 is turned back to the original position by the carrier recess 136 and the carrier arm 134, with the amount of turning in a clockwise direction being limited by a stop 152 with which the carrier section 138 comes into contact.

The gap limiter 106 is designed as a swiveling clip which is attached in a swiveling manner by means of a joint pin 160 to a mounting piece 162 which is solidly attached to the frame, with the swiveling axis being essentially parallel to the direction of displacement of the slide element 122 when the leaf is closed. To put it another way, the swiveling axis of the swiveling clip 106, which lies in a horizontal plane, is parallel to the fixed frame plane, or when the leaf is closed, parallel to the leaf plane. The mounting piece 162 is firmly screwed onto the fixed frame 110 by means of screws 164 in a recess 166 which is adapted to the shape of the mounting piece 162, with the recess 166 being open on the side which is closer to the door leaf 108 when the door is opened, so that the swiveling lever 106, as shown in FIG. 3, can swivel out from the vertical position indicated in FIG. 3 by a broken line. Unless it is externally acted upon, the swiveling clip 106 is held in its vertical position by the force of gravity.

The swiveling clip 106 has a slide 168 (which can also be referred to as a hole or perforation) with a first slide section 168*a* and a second slide section 168*b*. The slide section 168*a* extends with a constant width parallel to a longitudinal axis of the swiveling clip and takes up the majority of the slide 168. The essentially circular slide section 168*b* is adjacent to the first slide section 168*a*, with the diameter of this second slide section 168*b* appreciably exceeding the width of the first slide section 168*a*, giving rise to the keyhole-like slide shape which can be clearly seen in FIG. 3. The driving pin 120, which is coordinated with the slide 168, has a pin head 170 on its end which extends from the housing 124 in the driving position, and adjacent to this, in the direction of the end of the driving pin 120 on the end toward the inside of the housing, is a section of the driving pin 120 which is referred to in the following as the driving section 172. The diameter of the pin head 170 exceeds the diameter of the driving section 172 and the width of the first slide section 168*a*, but is smaller than the diameter of the second slide section 168*b*. The diameter of the driving section 172 is smaller than the width of the first slide section 168*a*.

If the driving pin 120 is now moved into the driving position with the leaf closed, the pin head 170 extends through the second slide section 168*b* so that the driving section 172, as can be seen in FIG. 4, engages with the slide 168 in such a manner that the pin head 170 is positioned on the fixed-frame side of the swiveling clip 106, and a short partial section of the driving section 172 is positioned on either side of the swiveling clip 106. When the door leaf 108 is opened, the driving section 172 comes into contact with the slide edge 174 which borders the slide 168 and swivels the swiveling clip 106 when the door leaf 108 is opened further, out of the vertical position, with the driving pin 120 sliding off the slide edge 174 with its driving section 172 and entering the first slide section 168*a* from the second slide section 168*b*. The door leaf 108 can be opened until the driving section 172 comes into contact with the slide end 176 which is away from the joint pin 160 or the corresponding section of the slide edge 174. The swiveling clip 106 therefore limits the angle of opening of the door leaf to a maximum possible gap angle. During swiveling out of the swiveling clip 106, the bolt head 170 catches behind the slide edge 174 in the first slide section 168*a* so that the driving pin 120 is securely kept engaged with the slide 168 and cannot come out of the slide.

When the slightly opened leaf is closed, the driving pin 120 moves, with respect to the slide 168, back in the direction of the second slide section 168*b*, with the swiveling lever 106 synchronously swiveling back in the direction of its vertical position. When the leaf is in a closed position, the driving pin 120 reaches the second slide section, and the swiveling clip 106 reaches its vertical position. At this point, the driving pin 120 can again be moved into the release position by corresponding operation of the turning knob, for example, in order to open the door normally.

It is also possible to return the driving pin 120 from the driving position to the release position from the main lock. This mode of operation of the door-restraining device 104 is particularly important so that it is always possible to open a door from the outside, i.e., regardless of the position of the driving pin. According to the invention, the driving pin 120 can only be moved by actuation of the latch 178, from the main lock 102 out of the driving position into the release position by means of the locking element, in this case a key. Connection of the main lock 102 and the door-restraining device 104 is carried out in this case via the abovementioned driving pin connecting rod 112. At its end on the side of the door-restraining device, the driving pin connecting rod 112 engages with the holding element 140 in such a manner that a connection between the holding element 140 and the driving pin connecting rod 112 is established which is resistant to pulling and pressure. To this end, a lateral tongue section 180 of the holding element 140 engages with a lateral fork section 182 on the driving pin connecting rod 112.

The end of the driving pin connecting rod 112 on the side of the main lock is constantly engaged via a lateral fork section 184 of the connecting rod 112 with the first of two arms of the transfer lever 114, which is positioned in the main lock in a turnable manner, with said transfer lever 114 corresponding to the transfer lever 114' of the main lock of FIG. 2. The driving pin connecting rod 112 and the transfer lever 114 are connected in a moveable manner in such a way that each turning movement of the transfer lever 114 corresponds to a displacement position of the driving pin connecting rod. In the same manner, the holding element 140 and the driving pin connecting rod 112 are connected in a moveable manner (with each displacement position of the holding element 140 corresponding to a displacement position of the driving pin connecting rod 112), in such a way that con-nection in a moveable manner of the transfer lever 114 and the holding element 140 is established (with each displacement position of the holding element 140 corresponding to a turning position of the transfer lever 114).

When the driving pin 120 assumes its driving position (cf. FIG. 4 and FIG. 1*a*), the second arm of the transfer lever 114 is positioned in such a manner that it extends into the swiveling area of the end section 168*a* of the latch lever 196. In this case, as explained in the above with reference to the connecting rod lock of FIG. 2, if the latch lever 196 is now operated by means of the key in order to retract the latch 178, the latch lever 196, which swivels in a clockwise direction as shown in FIG. 1, turns the transfer lever 114 counterclockwise so that the carrier pin connecting rod 112, and thus the holding element 140, move downward, and the holding finger 146 comes out of the holding recess 184. Therefore, the holding element 140 no longer holds the slide element 122 in place, so the pulling springs 142 pull the driving pin 120 over the slide element 122 into the release position, with the knob nut 132 being turned back from the turning position shown in FIG. 1*a* to the turning position shown in FIG. 1*b*, as described above.

As can be seen in FIG. 1*b* in comparison to FIG. 1*a*, the pressing spring 144, when the driving pin 120 is in the release position, cannot displace the holding element 140 as far upward as when the driving pin 120 is in the driving position. With respect to the displacement position of the holding element 140 in FIG. 1*a* with the driving pin in the driving position, the holding element 140 is displaced downward by the driving section 138 of the knob nut 132 as shown in FIG. 1*b* with the driving pin 120 in the release position. Correspondingly, the transfer lever 114 is turned in a counter-clockwise direction (FIG. 1*b*) with respect to the turning position of FIG. 1*a* when the driving pin 120 is positioned in the release position. In this turning position, the second arm of the transfer lever 114 no longer engages with the swiveling area of the end section 198*a* of the latch lever 198, with the result that the latch lever can freely swivel back and forth in order to retract the latch 178 and allow the latch 178 to be slid out again.

From the description of the main lock of FIG. 2, it can be seen that the movements of the driving pin connecting rod 112 and the auxiliary pin connecting rod 116 are independent of each other. The auxiliary pin connecting rod 116 is displaced in one or the other direction synchronously with the operation of the bolt, which is not shown in FIG. 1, and in contrast, the driving pin connecting rod 112, and thus the holding element 140, retain their respective slide position when the bolt is activated, and correspondingly, the driving pin 120 also remains in its respective position. The driving pin connecting rod 112 is only displaced if, with the driving pin 120 positioned in the driving position, the latch lever 196 swivels in the retraction direction of the latch 178 due to corresponding operation of the main lock 102 by means of the key in order to retract the latch 178, and in so doing, pulls on the carrier pin connecting rod 112 via the transfer lever 114. The holding finger 146 then disengages from the holding recess 148 on the slide element 122, and when the driving pin element 120 is moved into the release position, the driving pin connecting rod 112 is further displaced corresponding to the displacement movement of the holding element 140 under the action of the moving slide element 122 and the turning knob nut 132.

With reference to FIG. 5, we will now explain a second practical example of a locking device according to the invention, and in comparison to the practical example of FIGS. 1, 3, and 4, there are differences only in the design of the door-restraining device and the mounting component on the side of the fixed frame which supports the swiveling clip. Components of the second practical example which correspond in their function to those of the first practical example according to FIGS. 1, 3, and 4 are identified with the same reference numbers, but increased by the number 100. In the following, we will only discuss the differences between the two practical examples, and moreover, with specific reference to the above description of the first practical example.

Figure 5B:
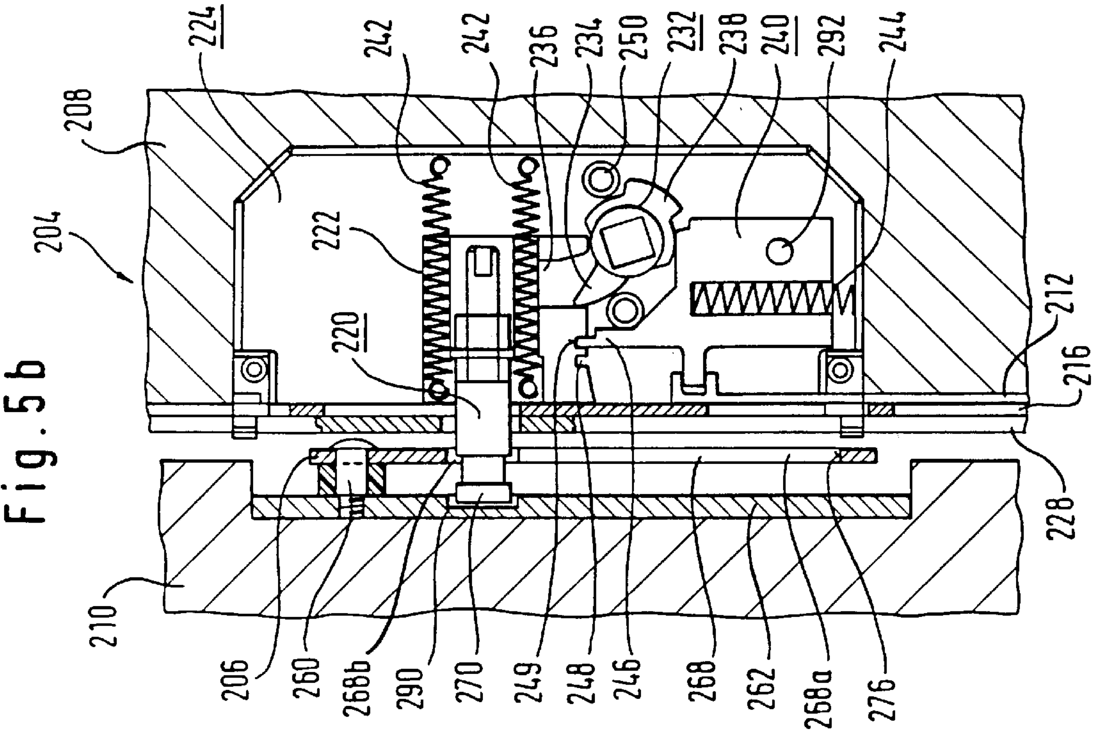
FIG. 5 shows another embodiment of the leaf-restraining device according to the invention, with the driving pin in the driving position in FIG. 5*a* and in a locked position in FIG. 5*b*.
Figure 5A:
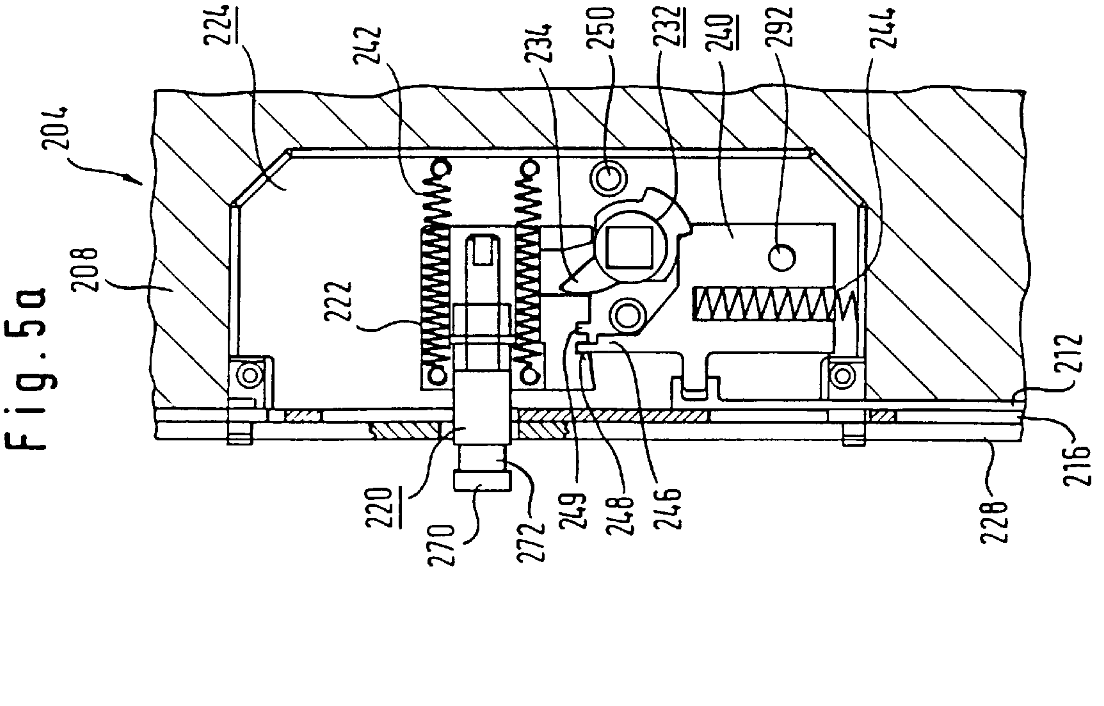

In the door-restraining device 204 of FIG. 5, the driving pin 220 can be slid past the driving position shown in FIG. 5*a* further out of the housing 224 into a locked position in which, with the leaf closed, the pin head 270 engages in a locking recess 290 in the mounting component 262 which is attached to the frame and locks the leaf onto the fixed frame (cf. FIG. 5*b*). The recess 290 is essentially aligned with the second slide section 268*b*, with the swiveling clip 206 positioned in the vertical position. The pin head 270 is designed in the form of a circular cylinder, in contrast to the pin head 170 of the first practical example, which tapered towards its end.

Compared to the slide element 122 of the first practical example, the displacement element 220 is shorter in the dis-placement direction in order to achieve the required greater displacement stroke and shows a second holding recess 249 which can be engaged with the free end of the holding finger 246 of the holding element 240 in order to hold the slide element 222 in the displacement position corresponding to the locked position of the driving pin 220. The two holding recesses 248 and 249 on the slide element 222 and the free end of the holding finger 246 are narrower in the displacement direction of the slide element compared to the holding recess 149 and the free end of the holding finger 146 of the first practical example.

The movement of the driving pin 220 from the release position to the driving position shown in FIG. 5*a* is carried out in the same manner as described above for the first practical example. The further sliding out of the driving pin 220 from the housing 224 into the locked position is also carried out by turning the knob nut 232 past the turning position shown in FIG. 5*a* in a counter-clockwise direction. The carrier arm 243 of the knob nut 232 is longer than the carrier arm 134 of the first practical example shown so that it can press the slide 222 past the position shown in FIG. 5*a* toward the end of the housing on the sleeve side. In order to make this additional turning of the knob nut 232 possible, the stop 250 is moved upward compared to the stop 150 of the first practical example.

However, as long as the slide element 222 is held in the position corresponding to the driving position of the driving pin 220 by the holding element 240 (by means of engagement of the free end of the holding finger 246 in the first holding recess 249), the driving pin 220 cannot be moved into the driving position. In order to release the slide element 222, the holding element 240 has a slide grip 292 which protrudes from the housing 224 through a corresponding oblong hole, by means of which the holding element 240 can be slid downward in order to release the slide element 222 so that the driving pin 220 can be moved from the carrier position to the locked position or directly from the release position into the locked position by correspondingly turning the turning knob.

If the driving pin 220 is to be moved back from the locked position to the release position, this is carried out from the door-restraining device by operating the turning knob as described above, i.e., by turning the turning knob in a clockwise direction as shown in FIG. 5, or alternatively, by corresponding operation of the slide grip 292, i.e., by directly sliding the holding element 240 downward so that the free end of the holding finger 246 and the second holding recess 249 are disengaged. In the same manner, the holding element 240 can also be directly operated by means of the slide grip 292 for moving the driving pin 220 from the driving position to the release position.

The movement of the driving pin 220 from the locked position or from the driving position into the release position is carried out from the main lock as described above. On operation of the latch by means of the key, the driving pin connecting rod 216, and thus the holding element 240, is slid so far past the latch lever and the transfer lever that in a case in which the driving pin 220 is in the locked position, the driving pin 220 reliably reaches the release position due to the action of the springs 242, without it being possible for the free end of the holding finger 246 to enter the first holding recess 248, with the result that the driving pin under no circumstances remains in the driving position. Therefore, for example, if the door is opened from outside by means of a key, by correspondingly turning the key in order to retract the latch, one can always immediately open the door regardless of whether the driving pin was previously in the release position, the driving position, or the locked position.

In summary, the invention concerns a locking device for a door, etc., having a fixed frame and a key, comprising a main lock and a door-restraining device on the leaf, in which a driving pin of the leaf-restraining device can be engaged with a gap limiter on the fixed frame. The main lock and the leaf-restraining device are connected with each other in such a manner that from the main lock, the driving pin can only be disengaged from the gap limiter by operating the latch of the main lock by means of a locking element.

We claim:

1. A locking device for a door having a fixed frame and a leaf comprising:

a main lock on the leaf with a bolt which can be operated by means of a locking element through a bolt-operating device and a latch which can be operated both by means of the locking element and by means of a door handle through a latch-operating device, the latch being engageable with an edge plate on a side of the fixed frame; and a leaf-restraining device on the leaf, the leaf-restraining device being separate from the main lock and having a driving pin which is supported in a moveable manner in a housing of the leaf-restraining device by means of a driving-pin-operating device moveable between a release position and a driving position and which, when the leaf is closed, is disengaged from an engagement section of a gap limiter attached to the fixed frame in a release position of the driving pin and is engaged with the engagement section of the gap limiter in a driving position of the driving pin in order to move the gap limiter, on opening of the leaf, until a maximum possible gap position of the leaf, determined by the gap limiter, is reached, with the main lock and the leaf-restraining device being connected to each other in such a manner that the driving pin can be moved, from the main lock, from the driving position to the release position by means of the locking element, wherein from the main lock, the driving pin can only be moved from the driving position to the release position by operating the latch by means of the locking element, and not by operating the latch by means of the door handle, nor by operating the bolt by means of the locking element.

2. A locking device according to claim 1, wherein connection of the main lock and the leaf-restraining device is established by a connecting element which connects the latch-operating device and the driving pin operating device.

3. A locking device according to claim 2, wherein the connecting element is connected to a component device of the latch-operating device which is operated with a locking element.

4. A locking device according to claim 3, wherein, for mechanical connection of the main lock and the leaf-restraining device, the connecting element is a pulling element or a pressing element.

5. A locking device according to claim 4, wherein, in order to move the driving pin from the driving position to the release position, the connecting element is operated by means of a latch lever used to retract the latch.

6. A locking device according to claim 4, wherein, in order to move the driving pin from the driving position to the release position, the connecting element is acted on by a pulling force.

7. A locking device according to claim 6, wherein the pulling force is transferred from the latch lever to the connecting element when the latch lever is swiveled in order to retract the latch.

8. A locking device according to claim 7, wherein the driving pin operating device has a manual adjusting component for manually moving the driving pin between the driving position and the release position.

9. A locking device according to claim 8, wherein the driving pin operating device has an additional component device which can be released by the connecting element or the manual adjusting component in order to move the driving pin, which is in the driving position, into the release position by means of the additional component device.

10. A locking device according to claim 9, wherein the additional component device has an energy-storing device which is loaded when the driving pin is moved from the release position to the driving position and prestresses the driving pin in the direction of the release position.

11. A locking device according to claim 10, wherein the energy-storing device is composed of spring means.

12. A locking element according to claim 11, wherein the additional component device has holding means which hold the driving pin in the driving position after the driving pin has been moved to the driving position until the additional component device is released.

13. A locking element according to claim 10, wherein the driving pin is attached to a displaceably supported slide element with which the energy-storing device engages.

14. A locking element according to claim 13, wherein the holding means have a holding recess on the slide element and a moveable holding element with the holding element having a holding engagement section and with it being possible to move the holding element, with the driving pin in the driving position, into a holding engagement position, in which the holding engagement section is engaged with the holding recess.

15. A locking element according to claim 14, wherein, in order to release the additional component device, the holding element is moved in such a manner that the holding engagement section is disengaged from the holding recess.

16. A locking element according to claim 14 or 15, wherein the holding element is designed as a sliding element.

17. A locking element according to claim 16, wherein the holding element can be displaced in a displacement direction which is essentially perpendicular to the displacement direction of the slide element.

18. A locking element according to claim 14, wherein the holding element is pre-stressed in the direction of the holding engagement position by means of spring means.

19. A locking element according to claim 14, wherein the connecting element directly engages with the holding element in order to release the additional component device.

20. A locking element according to claim 14, wherein the manual adjusting component has a knob nut associated with a turning knob of the manual adjusting component which, with a first carrier section directly engages with the holding element in order to release the additional component device.

21. A locking element according to claim 14, wherein the manual adjusting component has a knob nut, associated with a turning knob of the manual adjusting component which, with a second carrier section directly engages with the slide element.

22. A locking element according to claim 21, wherein the knob nut for moving the driving pin from the release position to the driving position can be turned from a first turning position corresponding to the release position to a second turning position corresponding to the driving position, with the knob nut being engaged with the holding element when the driving pin is in the driving position and being held by the holding element in the second turning position until the additional component device is released, and with the knob nut after releasing of the additional component device, being turned back to the first turning position by the slide element which is moved by the force of the energy-storing device in order to move the driving pin back to the release position.

23. A locking element according to claim 1, wherein the gap limiter is in the form of a swiveling clip which is attached in a swiveling manner with one end to the fixed frame or a mounting component on the side of the fixed frame and has a slide which essentially extends in the longitudinal direction of the swiveling clip as an engagement section.

24. A locking element according to claim 23, wherein the swiveling clip can be swiveled about a swiveling axis which is essentially parallel to the plane of the fixed frame.

25. A locking element according to claim 23 or 24, wherein:

- the slide has a first slide section with a first slide width and a second slide section with a second slide width which is greater than the first slide width, with the second slide section being closer to the one end of the swiveling clip than the first slide section;
- the driving pin has a pin head with a cross-sectional dimension which is smaller than the second slide width and larger than the first slide width;
- the driving pin has a driving section which is adjacent to the pin head and has a cross-sectional dimension which is smaller than the first slide width;
- the pin head, when the leaf is closed, protrudes through the second slide section when the driving pin is moved from the release position to the driving position; and
- the driving pin, after the pin head protrudes through the second slide section and after the driving position is reached, engages with the driving section in the slide with the driving section when the leaf is opened slightly with swiveling of the swiveling clip, entering the first slide section from the second slide section, and after the maximum possible gap position of the leaf is reached, coming into contact with a slide end which is away from the one end of the swiveling clip.

26. A locking device according to claim 1, wherein the driving pin when the leaf is closed, can be moved from the release position past the driving position into a locked position, in which the driving pin locks the leaf on the frame into the locked position of the leaf.

27. A locking device according to claim 26, wherein, from the main lock, the driving pin can be moved from the locked position into the release position by operating the latch by means of the locking element.

28. A locking device according to claims 27, wherein the holding means keep the driving pin after the driving pin has been moved into the locked position, in the locked position until the additional component device is released, with the holding means comprising an auxiliary holding recess on the slide element which, when the driving pin is in the locked position, is engaged, in the holding engagement position of the holding element with the holding engagement section of the holding element.

29. A locking device according to claim 1, wherein the locking device has at least one auxiliary lock which is separate from the main lock and connected to the main lock, with an auxiliary bolt which can be operated from the main lock by means of an auxiliary bolt-operating mechanism of the auxiliary lock.

30. A locking device according to claim 29, wherein the auxiliary bolt is operated when the bolt is operated by means of the locking element.

31. A locking device according to claim 29 or 30, wherein connection of the main lock and the auxiliary lock is established by a connecting element which connects the bolt-operating device and the auxiliary bolt-operating device.

32. A locking device according to claim 31, wherein, for mechanical connection of the main lock and the auxiliary lock, in addition to the connecting element there is a separate auxiliary connecting element.

33. A locking device according to claim 32, wherein the connecting element and the auxiliary connecting element are positioned above and below each other or next to each other in a leaf groove in such a manner that they can be moved with respect to each other.

* * * * *

UNITED STATES PATENT AND TRADEMARK OFFICE

CERTIFICATE OF CORRECTION

PATENT NO. : 5,896,763

DATED : April 27, 1999

INVENTOR(S) : Alfred Dinkelborg et al.

It is certified that error appears in the above-identified patent and that said Letters Patent is hereby corrected as shown below:

Column 17, line 36, Claim 20: "section" should read --section,--.

Column 17, line 41, Claim 21: "section" should read --section,--.

Column 17, line 52, Claim 22: "nut" should read -- nut,--.

Column 18, line 27, Claim 26: "pin" should read -- pin,--.

Column 18, line 35, Claim 28: "claims" should read --claim--.

Column 18, line 36, Claim 28: "pin" should read -- pin,--.

Column 18, line 41, Claim 28: "engaged," should read -- engaged.

Signed and Sealed this

Twenty-fourth Day of October, 2000

*Attest:*

Q. TODD DICKINSON

*Attesting Officer*

*Director of Patents and Trademarks*